United States Patent [19]

Nankee, II et al.

[11] Patent Number: 5,881,703
[45] Date of Patent: Mar. 16, 1999

[54] METHOD OF DETERMINING THE COMPOSITION OF FUEL IN A FLEXIBLE FUELED VEHICLE

[75] Inventors: Robert J. Nankee, II, Canton; Yi Cheng, Jackson; Shean Huff, Ann Arbor; Mary Joyce, Farmington Hills; Jerry Kennie, Canton; Dennis A. Krozek, Novi; Richard K. Moote, Ann Arbor; Roland T. Richardson, Detroit; Gary L. Seitz, Chelsea, all of Mich.

[73] Assignee: Chrysler Corporation, Auburn Hills, Mich.

[21] Appl. No.: 958,411

[22] Filed: Oct. 29, 1997

[51] Int. Cl.⁶ .................................................. F02D 41/16
[52] U.S. Cl. .......................................... 123/686; 123/1 A
[58] Field of Search .................................... 123/686, 1 A, 123/689

[56] References Cited

U.S. PATENT DOCUMENTS

| | | | |
|---|---|---|---|
| 4,982,709 | 1/1991 | Oota | 123/1 A |
| 4,986,241 | 1/1991 | Inoue et al. | 123/479 |
| 5,197,450 | 3/1993 | Kitajima et al. | 123/685 |
| 5,253,631 | 10/1993 | Curran | 123/1 A |
| 5,255,661 | 10/1993 | Nankee, II et al. | 123/674 |
| 5,335,637 | 8/1994 | Davis et al. | 123/478 |
| 5,365,917 | 11/1994 | Adams et al. | 123/491 |
| 5,381,774 | 1/1995 | Nakajima | 123/674 |
| 5,400,762 | 3/1995 | Fodale et al. | 123/674 |
| 5,415,145 | 5/1995 | Letcher et al. | 123/491 |
| 5,435,285 | 7/1995 | Adams et al. | 123/492 |
| 5,467,755 | 11/1995 | Konrad et al. | 123/674 |
| 5,497,753 | 3/1996 | Kopera | 123/494 |
| 5,520,162 | 5/1996 | Rotramel et al. | 123/689 |

*Primary Examiner*—David A. Okonsky
*Attorney, Agent, or Firm*—Mark P. Calcaterra

[57] ABSTRACT

The present invention provides a flexible fuel compensation system for controlling operating parameters of an internal combustion engine based on a learned value of the percent alcohol content of the fuel using an oxygen feedback system. The methodology determines a fuel composition multiplier based on the percent alcohol content and implements gasoline operating parameters for the internal combustion engine if the fuel composition multiplier is less than a first threshold value, mixed gasoline/alcohol operating parameters if the fuel composition multiplier is greater than the first threshold value, and high concentration alcohol operating parameters if the fuel composition multiplier is greater than a second threshold value for a number of comparison checks. After a predetermined period, the fuel composition multiplier is updated and re-compared to the first and second thresholds and the appropriate one of the aforementioned operating parameters is implemented. A third update of the fuel composition multiplier is made if the determined fuel composition multiplier is less than the actual percent alcohol content of the fuel by more than a given amount.

32 Claims, 4 Drawing Sheets

METHOD OF DETERMINING THE COMPOSITION OF FUEL IN A FLEXIBLE FUELED VEHICLE

BACKGROUND OF THE INVENTION

1. Technical Field

The present invention relates generally to fuel control systems and, more particularly, to a method of determining the percent alcohol content of a fuel used in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

For example, U.S. Pat. No. 5,119,671, entitled "Method for Flexible Fuel Control", hereby expressly incorporated by reference, discloses a fuel composition sensor that measures the percent alcohol content of the fuel and relays that information to an engine controller or the like so that dependant variables such as spark timing and air/fuel ratio can be adjusted accordingly. Also, U.S. Pat. No. 5,255,661, entitled "Method for Determining Fuel Composition Using Oxygen Sensor Feedback Control", hereby expressly incorporated by reference, provides a method for determining the percent alcohol content of the fuel in the fuel tank utilizing an oxygen sensor feedback control loop to sense changes in air/fuel ratio and relay that information to the engine controller so that dependant variables can be adjusted accordingly.

Although these methods work well, there is room for improvement in the art. For instance, according to the prior art, there is no clear separation between gasoline operation and alcohol operation. Also, the prior art does not provide a way to insure that all of the alcohol is absent from the fuel before the on board diagnostics monitors (OBDII) are reenabled. Additionally, the prior art does not provide a way to identify users of high alcohol concentration fuel so that engine parameters can be modified accordingly. Moreover, the prior art does not provide a way for the fuel system monitor to detect errors during alcohol operation.

SUMMARY OF THE INVENTION

It is, therefore, one object of the present invention to provide a system of flexible fuel compensation.

It is another object of the present invention to provide a flexible fuel compensation system which delays fuel composition learning until the new fuel blend reaches the fuel injectors.

It is still another object of the present invention to provide a flexible fuel compensation system which coarsely learns the fuel composition of a fuel to roughly determine if gasoline or alcohol operation is appropriate.

It is yet another object of the present invention to provide a flexible fuel compensation system which reverts back to gasoline operation if the learned alcohol content is sufficiently low.

It is still yet another object of the present invention to provide a flexible fuel compensation system that enables select OBDII monitors only after a sufficient amount of gasoline has been used after an alcohol use.

It is also an object of the present invention to provide a flexible fuel compensation system that fine tunes the learned fuel composition if the alcohol concentration is high enough to warrant alcohol operation.

It is another object of the present invention to provide a flexible fuel compensation system that disables select OBDII monitors during alcohol operation.

It is yet another object of the present invention to provide a flexible fuel compensation system that monitors the use of high alcohol concentration fuel to better identify alcohol users.

It is still another object of the present invention to provide a flexible fuel compensation system that compensates for purged alcohol vapors when operating on alcohol.

It is still yet another object of the present invention to provide a flexible fuel compensation system that corrects errors detected in the fuel compensation multiplier with a third update routine if necessary.

It is also an object of the present invention to provide a flexible fuel compensation system that modifies the OBDII fuel system monitor to operate during both gasoline and alcohol operation.

The above and other objects are provided by a flexible fuel compensation system for controlling the operating parameters of an internal combustion engine based on a learned value of the percent alcohol content of fuel in the vehicles fuel system using an oxygen sensor feedback system. The methodology determines a fuel composition multiplier based on the percent alcohol content of the fuel and implements gasoline, alcohol or hybrid operating parameters for the internal combustion engine. For instance, if the fuel composition multiplier is less than a first threshold value gasoline operating parameters are implemented. If the fuel composition multiplier is greater than the first threshold value, mixed gasoline/alcohol operating parameters are implemented. If the fuel composition multiplier is greater than a second threshold value for a number of comparison checks, high concentration alcohol operating parameters are implemented.

In accordance with the teachings of the present invention, the fuel composition multiplier is updated and re-compared to the first and second thresholds after a predetermined period and the appropriate one of the aforementioned operating parameters is implemented. Also, during operation under mixed gasoline/alcohol parameters, compensation is made for corruptive fuel vapors drawn into the internal combustion engine. However, if the compensation reduces the amount of fuel delivered to the internal combustion engine more than a calibratable amount, the compensation for the corruptive fuel vapors is removed for engine start under cold engine conditions.

The present invention also performs a third update of the fuel composition multiplier if the determined fuel composition multiplier is less than the actual percent alcohol content of the fuel by more than a given amount. This is indicated by detecting when the compensation control for corruptive fuel vapors increases the amount of fuel delivered to the engine. Also, a fuel system monitor fault is set according to an oxygen sensor feedback term and a gasoline adaptive memory value if the fuel composition multiplier is below the first threshold. If the fuel composition multiplier is greater than the first threshold, the fuel system monitor fault is set according to the oxygen sensor feedback term and an alcohol vapor purge multiplier.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a flexible fuel compensation system which uses an oxygen feedback system rather than a fuel composition sensor to determine the percent alcohol content of fuel. According to the present invention, an alcohol threshold is used to determine the operating parameters to be set for the vehicle. When a fuel composition multiplier based on the percent alcohol content is below the alcohol threshold, gasoline operating parameters are used. When the fuel composition multiplier is above the alcohol threshold, alcohol operating parameters are used. Also, a counter of gasoline fills must be satisfied before OBDII monitors are reenabled. Additionally, users of high alcohol concentration fuel are identified and alcohol specific controls are disabled for gasoline and low alcohol concentration fuel users. Furthermore, an alcohol vapor purge multiplier is used in place of a gasoline long term fuel adaptive memory value when operating on alcohol fuel to allow for fuel system errors to be detected during alcohol operation.

One of the primary differences between alcohol and gasoline that must be taken into account when designing a system to run on mixtures of the two fuels is the stoichiometric fuel/air ratio. As the alcohol content of the fuel increases, the required fuel/air ratio increases. Furthermore, the fuel/air relationship between gasoline and pure alcohol is linear. As such, it has now been found that by determining the fuel/air ratio of gasoline for a given operating condition, an exhaust stream oxygen sensor feedback system can be used to enrichen the fuel such that alcohol blends will run at stoichiometry. Advantageously, the alcohol content of the fuel may then be inferred from the amount of enrichment needed for stoichiometry.

Although the present invention is suitable for use in either a return or returnless fuel system, it is presently preferred for operation in a returnless system. In a returnless system, once the fuel enters the fuel line the only exit from the system is through the fuel injectors into the engine. Therefore, after a fuel tank fill, the old fuel in the fuel lines must be expelled before the new fuel blend from the tank is used in the engine and the alcohol content is determined by the oxygen sensor feedback system. Accordingly, the alcohol content leaning routine of the present invention is delayed until the new fuel reaches the engine for a returnless system.

The delay is dependent on the flow rate of the fuel through the fuel system and is based on an accumulation of fuel injector pulse widths, which is proportional to the volume of fuel delivered. Using the fuel injector pulse widths as a measure of the amount of fuel delivered to the engine, the pulse width accumulation over time is correlated to the amount of fuel delivered before the new fuel starts to reach the engine. Either no delay or a short delay may be used for a return fuel system.

Additionally, flexible fueled vehicles commonly employ a long term fuel adaptive memory for storing a variable corresponding to the alcohol content of the fuel. In a returnless fuel system, this variable only changes after a fuel tank fill. Assuming that the old fuel in the vehicle tank is 0% alcohol and the composition of the added fuel is unknown, the gasoline long term fuel adaptive memory is held constant once the new fuel reaches the engine and the current value of the gasoline long term fuel adaptive memory represents the fuel compensation required for any variances in normal gasoline fuel control. For example, these variances include, but are not limited to, engine tolerancing and charge air temperature effects. Thereafter, any additional fuel compensation required must be a result of a change in the fuel's alcohol content which may occur, for example, by an undetected fuel addition.

Also in accordance with the present invention, a single variable is used to represent the fuel compensation required by the alcohol content of the fuel. This "fuel composition multiplier" is then used to infer the alcohol percentage of the fuel. The inferred alcohol percentage is used as the input to various fuel and spark controls that modify the calibrated gasoline fueling and spark delivery.

The fuel composition multiplier is incremented and decremented based on a short term exhaust stream oxygen sensor feedback variable. If the short term oxygen sensor feedback variable adds in more fuel than a given positive threshold, the fuel composition multiplier is incremented. If the short term oxygen sensor feedback variable takes out more fuel than a given negative threshold, the fuel composition multiplier is decremented. The positive and negative thresholds are variable but are based on engine coolant temperature and idle/off-idle status.

The update of the fuel composition multiplier is limited to steady state operating conditions so that any errors in transient fueling are not transferred to the fuel composition multiplier. In addition, the fuel vapor management system of the flexible fueled vehicle is disabled so that no fuel vapors from the fuel tank or vapor storage charcoal canister influence the determination of the alcohol content.

A coarse update of the fuel composition multiplier is continued until a minimum coolant temperature and injector pulse width accumulation or time delay are reached. This is to insure that the fuel mixture in the tank and the fuel mixture being delivered to the engine are the same and that cold engine fueling errors do not contribute to errors in the fuel composition multiplier. Once the coolant temperature and injector pulse width accumulation or time delay conditions are met, a coarse update completion timer is started which only counts during the steady state update of the fuel composition multiplier. When the completion timer reaches a calibratable value, the coarse update is complete.

If the fuel composition multiplier is below a given threshold when the coarse update completion timer expires, the fuel composition is close enough to that of pure gasoline such that normal gasoline operating parameters are resumed (for the case of 0% alcohol in the tank and unknown alcohol content fuel added). This threshold is referred to as the alcohol realm threshold. Returning to gasoline operation includes clearing the fuel composition multiplier to a 0% alcohol value and reenabling normal gasoline engine control operations except for OBDII monitors.

The OBDII monitors, except fuel system monitors and the oxygen sensor heater monitor, remain disabled when returning to gasoline operation after an alcohol use unless a given number of gasoline fills have been tabulated since the last alcohol fill. This is to insure that all of the alcohol has been fully depleted from the fuel. A counter is used to keep track of the number of fuel fills since the last alcohol use.

If a sufficient amount of time expires during the coarse update or when the coarse update exit timer expires and the fuel composition multiplier is above the alcohol realm threshold, the gasoline long term fuel adaptive memory is cleared. This clears any previously learned compensation settings for gasoline operation in order to remove any errors, especially errors caused by small amounts of alcohol that may not have been detected during previous fuelings.

Also, if the fuel composition multiplier is above the alcohol realm threshold when the coarse update exit timer expires, the percentage of alcohol contained in the fuel is sufficient to require specific alcohol related controls to be used. Therefore, the value of the fuel composition multiplier is stored in memory until the next fuel addition. Also, the gasoline long term fuel adaptive memory remains clear when operating in the alcohol realm and its functionality is replaced with the fuel composition multiplier. In addition, the counter used to keep track of the number of gasoline fills since the last alcohol use is initialized during alcohol use.

If the fuel composition multiplier is above a second, "elevated", alcohol threshold, a high concentration of alcohol is being used. At this point, a high alcohol usage counter is incremented to tabulate the number of times that a high concentration alcohol fuel has been used. This counter is used to enable certain features such as an engine roughness operation feature or a low fuel volume trigger for percent alcohol learning for the frequent alcohol user.

After the coarse update is complete, the fuel composition multiplier is re-updated or fine tuned when a second injector pulse width accumulation point is reached. The second pulse width accumulation point is large enough to insure that the new fuel (i.e., old fuel in the tank plus added fuel from the tank fill) is fully blended and that all of the old fuel is completely expelled from the fuel system. During this fine tune sequence, the fuel composition multiplier is only updated during steady state driving conditions. Steady state driving conditions are those conditions in which throttle, engine load and other such operating variables are relatively constant. As such, the fuel composition multiplier is held constant until another update is triggered when an exit timer associated with the fine tuning of the fuel composition multiplier expires. The exit timer only counts when in the steady state update of the fuel composition multiplier. After the exit timer expires, the fine tune learning, and the alcohol content determination, are complete.

When the alcohol content determination is complete (i.e., coarse learning and fine tuning are complete), the vehicle's fuel vapor management system is reenabled. To compensate for any corruption from fuel vapors drawn into the engine, an additional variable, referred to as the alcohol purge multiplier, is used when operating in the alcohol realm. This variable is only updated or used when the fuel vapor management system is enabled. Also, the alcohol purge multiplier is cleared during normal gasoline operation and each time the coarse update of the fuel composition multiplier is complete.

During fuel vapor management system operation, if the alcohol purge multiplier reduces the amount of fuel to be delivered to the engine by more than a calibratable amount, the methodology recognizes that there is a large amount of fuel vapor entering the engine. Since these vapors may not be present during a cold start, the alcohol purge multiplier is cleared when the engine is cold started.

When the fuel vapor management system is active during alcohol operation, the alcohol purge multiplier is continuously monitored. The generated fuel vapors can only cause the alcohol purge multiplier to reduce the amount of fuel being delivered. Therefore, if the alcohol purge multiplier indicates that an increase in the fuel being delivered is required, the methodology assumes that there is an error in the fuel composition multiplier. This error then indicates that the fuel composition multiplier is lower than the actual alcohol concentration in the fuel. If the required increase of fuel being delivered is greater than a given threshold, the methodology considers the error to be large enough to require a third update of the fuel composition multiplier.

The third update operates similar to the coarse update and also the fine tune update, in that it is based on the short term oxygen sensor feedback variable during steady state operating conditions. The third update is continued until a third update exit timer expires which is also only counted during steady state conditions. Also, the third update is only performed once between fuel additions.

Since the sensorless system (i.e., no fuel composition sensor) of the present invention freezes the long term fuel adaptive memory for alcohol fuel blends greater than a calibrated threshold, a conventional fuel system fault monitor must be altered. Freezing of the long term fuel adaptive memory would otherwise result in a fuel monitor fault not being detected because the normal long term fuel adaptive memory remains at a fixed value. According to the present invention, the total fuel correction is taken to be the product of the gasoline long term fuel adaptive memory value, the short term oxygen sensor feedback variable and the alcohol purge multiplier. When operating in the gasoline realm, the alcohol purge multiplier is equal to 1.0. When operating in the alcohol realm, the gasoline long term fuel adaptive memory is equal to 1.0. As such only the remaining two values influence the fueling correction. It should also be noted that the fuel system fault monitor is pended during a boil-off condition and fuel blending.

Due to the increased aging effects of ethanol on emission components and the unknown effect of ethanol on OBDII monitor operation, the OBDII monitors are disabled when operating on fuels containing greater than 30% ethanol. This is referred to as the OBDII monitors' ethanol threshold. To insure that the ethanol in the fuel is completely depleted, a number of tanks of gasoline are counted after each ethanol use before the OBDII monitors are reenabled.

The OBDII monitors' ethanol threshold is interpolated from an off-idle gasoline purge gasoline long term fuel adaptive memory value. If the ethanol content of the fuel is greater than the OBDII monitors' ethanol threshold at the end of the coarse update, an OBDII monitors pending counter is set to a calibrated value. If the ethanol content is less than the OBDII monitors' ethanol threshold at the end of the coarse update, the OBDII monitors pending counter is decremented. As such, the OBDII monitors are pended when the OBDII monitors pending counter is not equal to zero.

Figure 1:
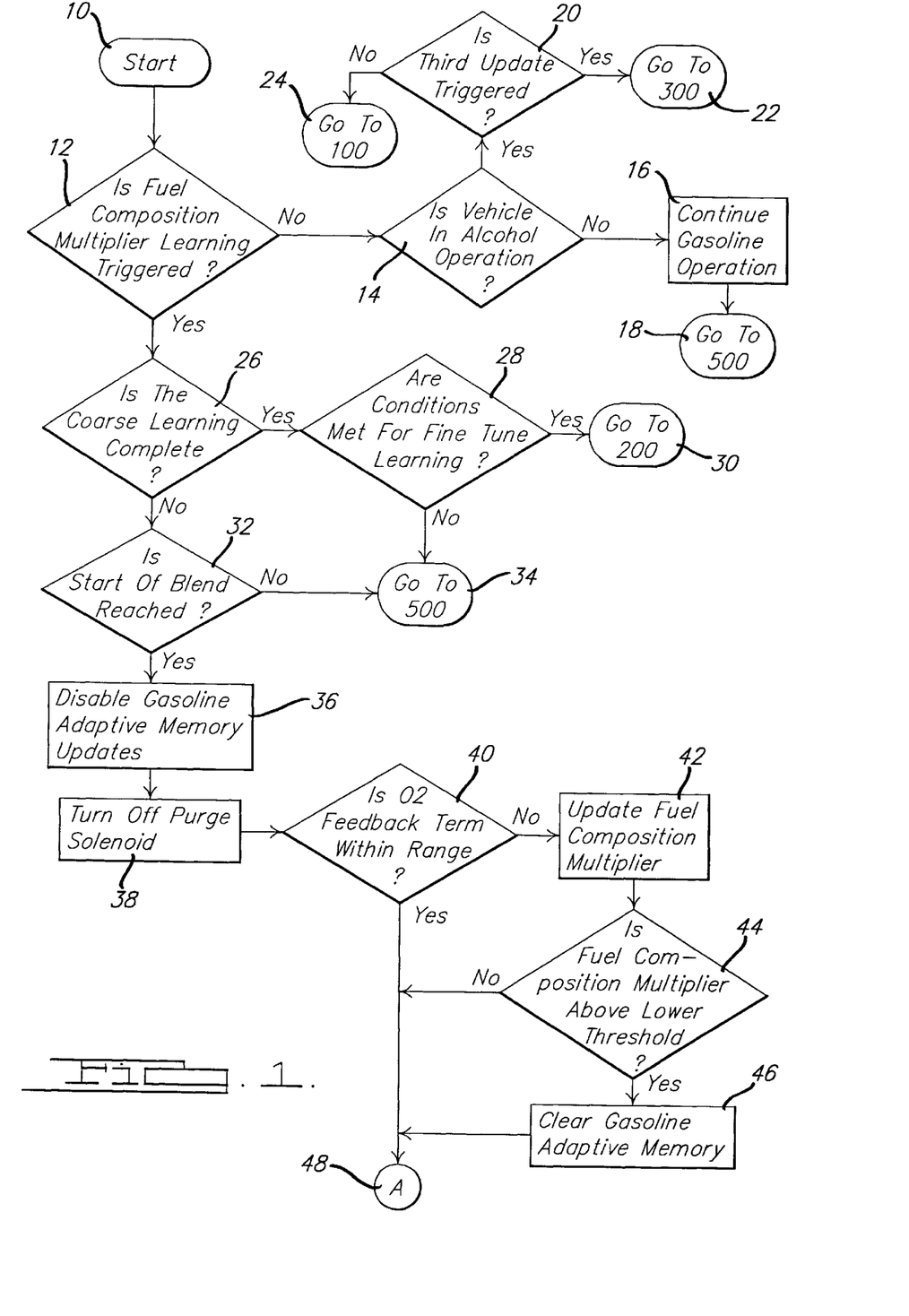
FIG. 1 is a flow chart of a method of flexible fuel compensation control for a flexible fuel compensation system of a motor vehicle.

Turning now to the drawing figures, FIG. 1 is a flow chart for a method of flexible fuel compensation control for a flexible fuel compensation system in a motor vehicle. The methodology starts in bubble 10 and advances to decision block 12. In decision block 12, the methodology determines whether the fuel composition multiplier learning system has been trigged. Although a number of triggering methods are available, it is presently preferred to use the methodology disclosed in U.S. Ser. No. 08/958,403 entitled "Method of Triggering a Determination of the Composition of Fuel in a Flexible Fueled Vehicle" to Kennie et al. which is expressly incorporated by reference herein.

If the learning system has not been triggered, the methodology advances to decision block 14 and determines whether the vehicle is operating on alcohol fuel (e.g., ≧E30). If not, the methodology advances to block 16 and continues gasoline based engine operation. From block 16, the methodology advances to bubble 18 where it is forwarded to bubble 500 (FIG. 5) and is returned to bubble 10.

Figures 3, 4:
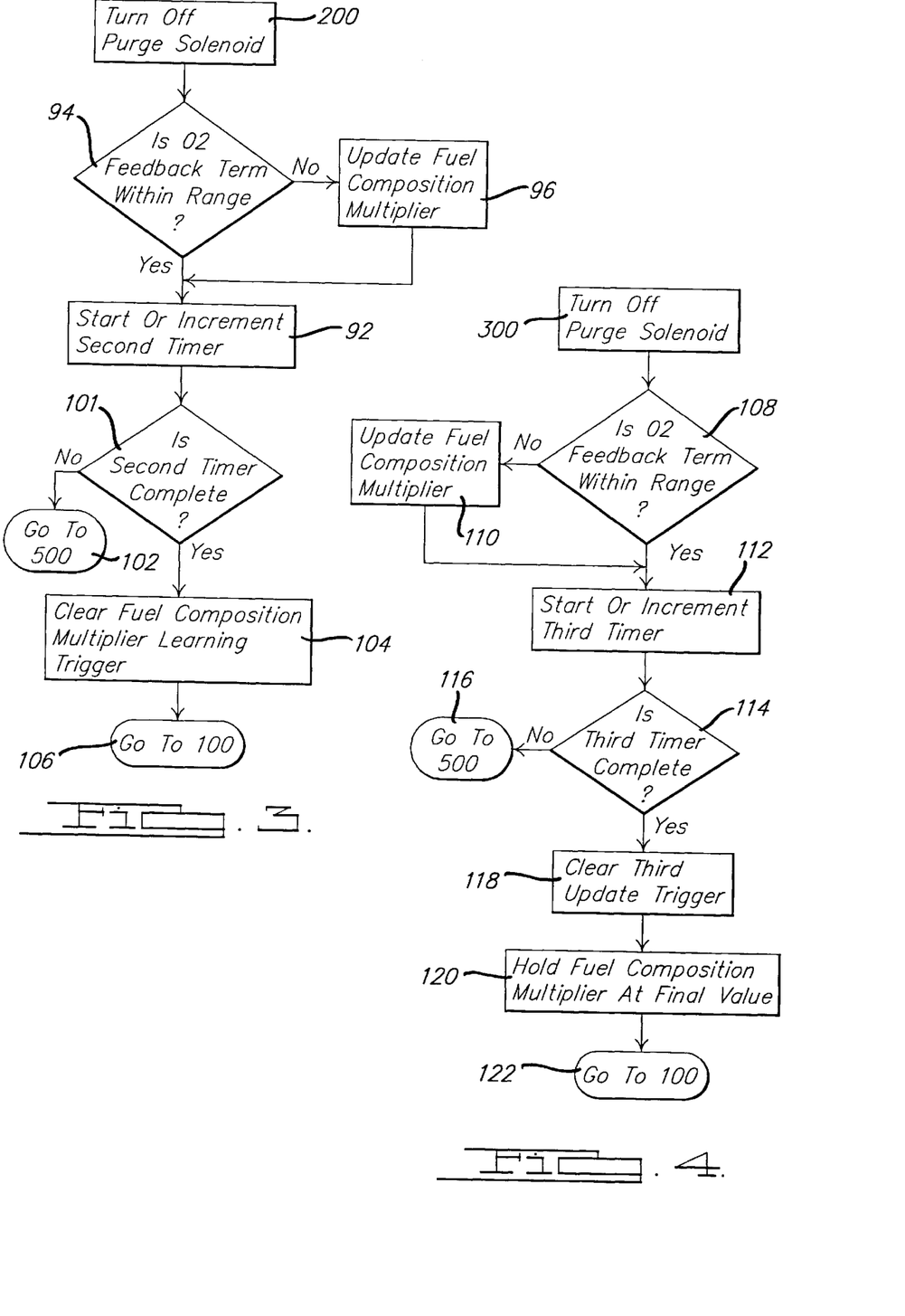
FIG. 3 is a flow chart of a sub-routine for the method of FIG. 1.
FIG. 4 is a flow chart of a sub-routine for the method of FIG. 1.
Figures 5, 6:
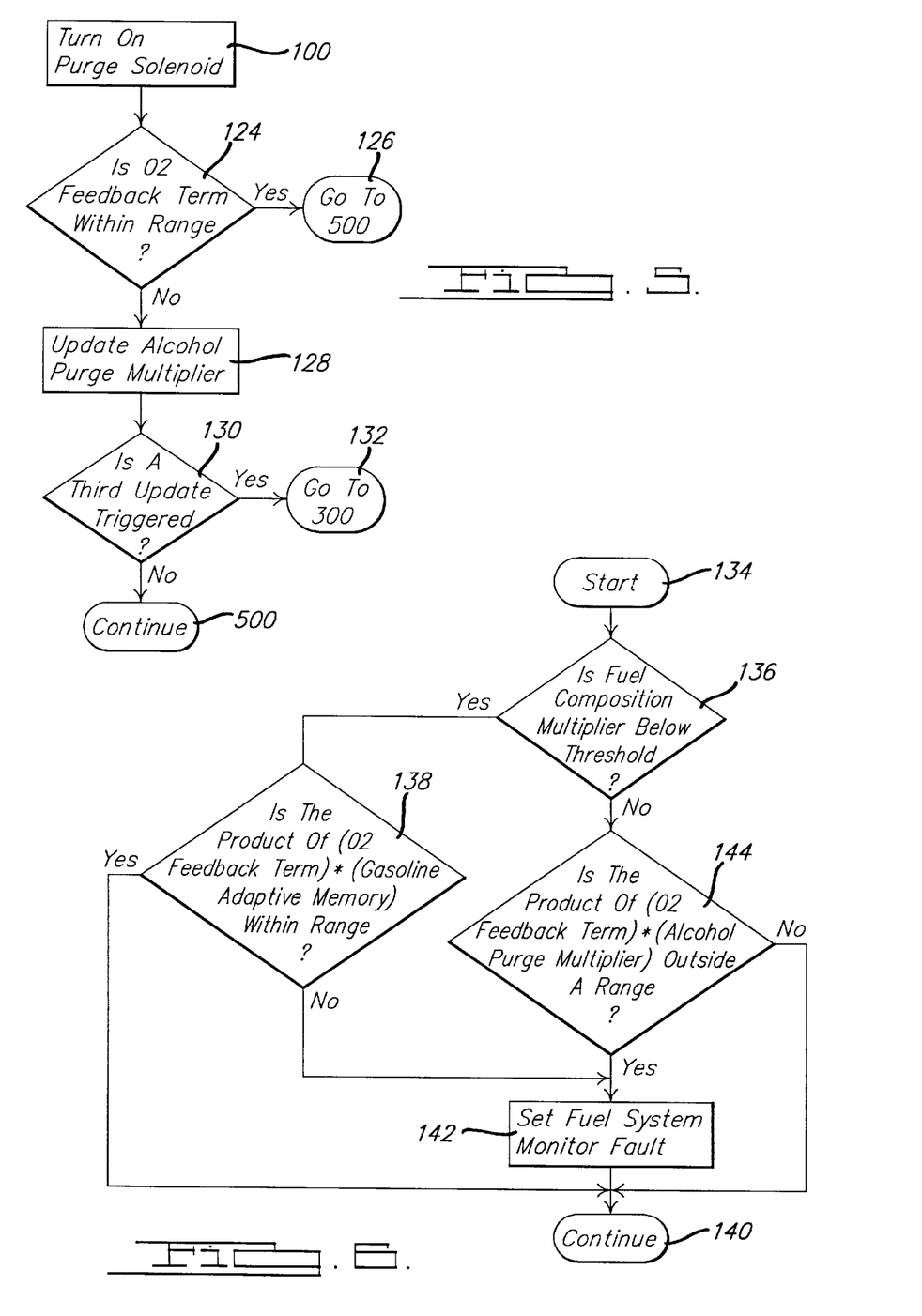
FIG. 5 is a flow chart of a sub-routine for the method of FIG. 1.
FIG. 6 is a flow chart of a method for operating a fuel system monitor within the flexible fuel compensation system of the present invention.

If the vehicle is in an alcohol operating mode at decision block 14, the methodology advances to decision block 20 and determines if the third update feature has been triggered. If so, the methodology advances to bubble 22 where it is forwarded to block 300 (FIG. 4). If the third update has not been triggered, the methodology advances to bubble 24 where it is forwarded to block 100 (FIG. 5). Blocks 300 and 100 are described in greater detail below with specific reference to FIGS. 4 and 5.

Returning to decision block 12, if the fuel composition multiplier learning system has been triggered, the methodology advances to decision block 26 and determines if the coarse learning update feature for determining the fuel composition is complete. If so, the methodology advances to decision block 28. In decision block 28, the methodology determines if various conditions (such as the coarse update being complete and a second injector pulse width accumulation point is reached) are met for fine tune learning of the fuel composition. If the conditions are met, the methodology advances to bubble 30 where it is advanced to block 200 (FIG. 3).

If the course learning of the fuel composition is not complete at decision block 26, the methodology advances to decision block 32 and determines if blending of the old fuel in the tank and the new fuel from the tank fill has started. If fuel blending has not started in decision block 32, or if conditions are not met for fine tune learning in decision block 28, the methodology advances to bubble 34 where it is forwarded to bubble 500 (FIG. 5) and is returned to start-up bubble 10.

If the fuel has started to blend in decision block 32, the methodology advances to block 36 and disables a gasoline long term fuel adapted memory update feature. From block 36, the methodology advances to block 38 and disables the fuel vapor purge solenoid. From block 38 the methodology advances to decision block 40 and determines if the short term oxygen sensor feedback variable is within a given range. If not, the methodology advances to block 42 and updates the fuel composition multiplier.

From block 42, the methodology advances to decision block 44. In decision block 44, the methodology determines if the fuel composition multiplier is above a low value threshold. If so, the methodology advances to block 46 and clears the gasoline long term fuel adaptive memory. After the methodology clears the gasoline adaptive memory in block 46, or if the fuel composition multiplier is below the low value threshold at decision block 44, or if the short term oxygen sensor feedback variable is within the preselected range in decision block 40, the methodology advances through connector 48 to decision block 50 illustrated in FIG. 2.

Figure 2:
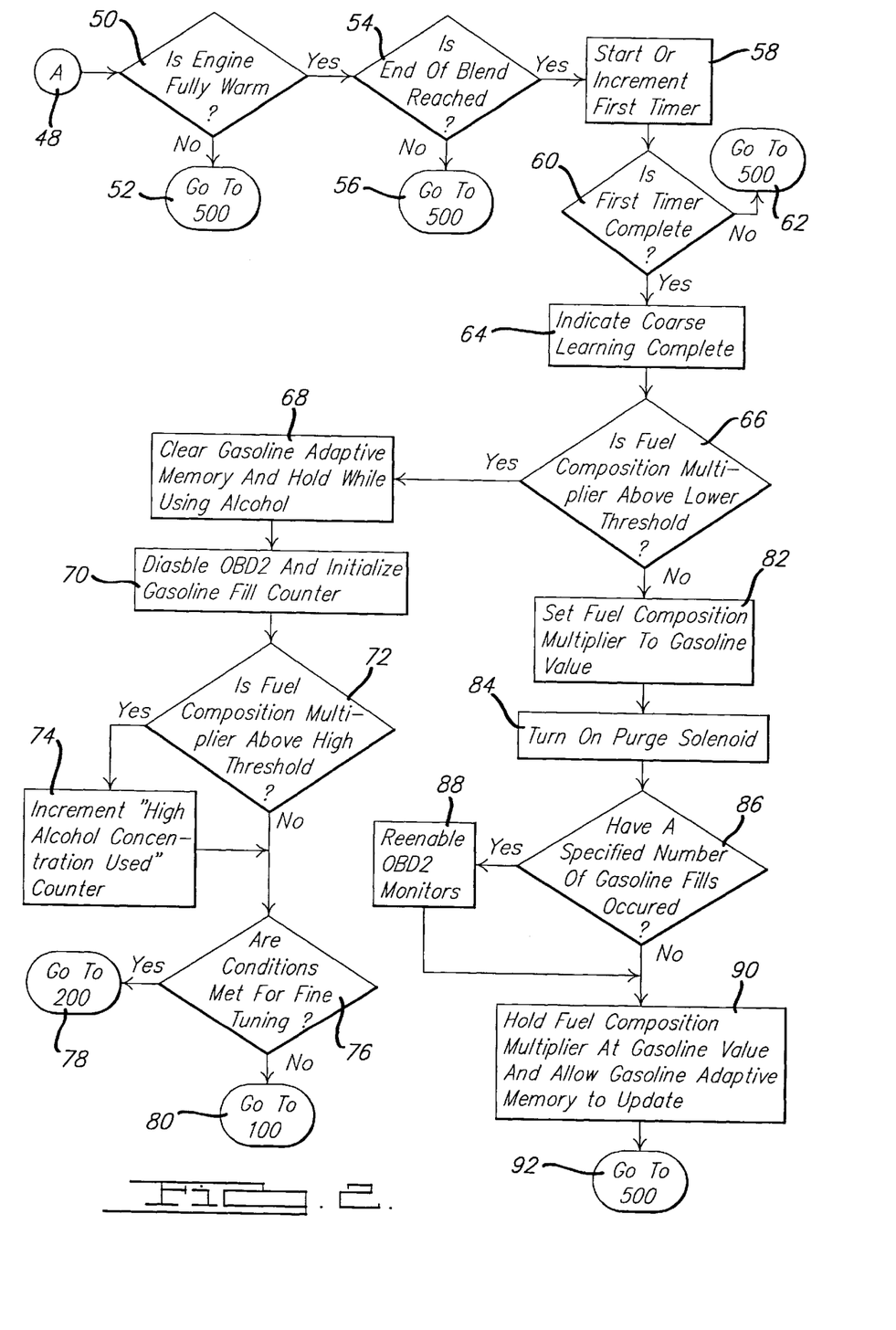
FIG. 2 is a continuation of the flow chart of FIG. 1.

Referring now primarily to FIG. 2, in decision block 50, the methodology determines if the engine has reached a fully warm condition. If not, the methodology advances to bubble 52 and is forwarded to bubble 500 (FIG. 5) and is returned to start-up bubble 10 (FIG. 1). If the engine has reached a fully warm condition in decision block 50, the methodology advances to decision block 54 and determines if the end of the fuel blending period has been reached. If not, the methodology advances to bubble 56 and is forwarded to bubble 500 where it is returned to start-up bubble 10.

If the end of the fuel blending period has been reached in decision block 54, the methodology advances to block 58 and starts or increments a first timer. From block 58, the methodology advances to decision block 60 and determines if the first timer is complete. If not, the methodology advances to bubble 62 where it is forwarded to bubble 500 and returned to start-up bubble 10. If the first timer is complete at decision block 60, the methodology advances to block 64 and sets a flag to indicate that the coarse learning step for determining the fuel composition is complete.

From block 64, the methodology advances to decision block 66 and determines if the fuel composition multiplier is above the low value threshold. If so, the methodology advances to block 68 where it clears and freezes the gasoline long term fuel adaptive memory while the vehicle is operating an alcohol. From block 68, the methodology advances to block 70 and disables select OBDII monitors (all but fuel system monitors and oxygen sensor heater monitor) and initializes the gasoline fill counter.

From block 70, the methodology advances to decision block 72 and determines if the fuel composition multiplier is above a high value threshold. If so, the methodology advances to block 74 and increments a second, "high alcohol concentration used", counter. From block 74, or if the fuel composition multiplier is below the high value threshold at decision block 72, the methodology advances to decision block 76.

In decision block 76, the methodology determines if various conditions (such as the coarse learning update being complete and a second injector pulse width accumulation point reached) have been met for fine tune learning of the fuel composition. If so, the methodology advances to bubble 78 where it is forwarded to block 200. If the conditions are not met for fine tune learning in decision block 76, the methodology advances to bubble 80 where it is forwarded block 100 (FIG. 5).

Returning to decision block 66, if the fuel composition multiplier is not above the low value threshold, the methodology advances to block 82. In block 82, the methodology sets the fuel composition multiplier to a gasoline operation value. From block 82, the methodology advances to block 84 and enables the fuel vapor purge solenoid. From block 84, the methodology advances to decision block 86.

In decision block 86, the methodology determines if a specified number of gasoline fills have occurred. If so, the methodology advances to block 88 and re-enables the OBDII monitors. After the OBDII monitors are re-enabled at block 88, or if the specified number of gasoline fills has not occurred in decision block 86, the methodology advances to block 90 and holds the fuel composition multiplier at the gasoline value and allows the gasoline long term fuel adapted memory to be updated. From block 90, the methodology advances to bubble 92 where it is forwarded to bubble 500 (FIG. 5) and returned to start-up bubble 10.

Referring now to FIG. 3, the fine tune learning sub-routine of the method of FIG. 1 will be described in greater detail. In block 200, the methodology disables the fuel vapor purge solenoid. After turning off the fuel vapor purge solenoid in block 200, the methodology advances to decision block 94. In decision block 94, the methodology determines if the short term oxygen sensor feedback variable is within a specified range. If not, the methodology advances to block 96 and updates the fuel composition multiplier. After updating the fuel composition multiplier in block 96, or if the short term oxygen sensor feedback variable is within the pre-selected range at decision block 94, the methodology advances to block 98.

In block 98, the methodology starts or increments a second timer. After starting or incrementing the second timer in block 98, the methodology advances to decision block 101 and determines if the second timer is complete. If not, the methodology advances to bubble 102 where it is forwarded to bubble 500 (FIG. 5) and returned to start-up bubble 10.

If the second timer is complete at decision block 101, the methodology advances to block 104. In block 104, the methodology clears the fuel composition multiplier learning trigger. From block 104, the methodology continues to bubble 106 where it is forwarded to block 100 (FIG. 5).

Turning now to FIG. 4, the third update sub-routine of the method illustrated in FIG. 1 is the depicted. In block 300, the methodology disables the fuel vapor purge solenoid. After the methodology turns off the purge solenoid in block 300, the methodology advances to decision block 108. In decision block 108, the methodology determines if the short term oxygen sensor feedback variable is within a specified range. If not, the methodology advances to block 110 and updates the fuel composition multiplier. After updating the fuel composition multiplier at block 110, or if the short term oxygen sensor feedback variable is within the specified range at decision block 108, the methodology advances to block 112.

In block 112, the methodology starts or increments a third timer. After starting or incrementing the third timer at block 112, the methodology advances to decision block 114. In decision block 114, the methodology determines if the third timer is complete. If not, the methodology advances to bubble 116 and is forwarded to bubble 500 (FIG. 5) where it is returned to start-up bubble 10 (FIG. 1).

If the third timer is complete at decision block 114, the methodology advances to block 118 where the third update trigger is cleared. After clearing the third update trigger in block 118, the methodology advances to block 120 where the fuel composition multiplier is held at the final value. From block 120, the methodology advances to bubble 122 where it is forwarded to block 100 (FIG. 5).

Turning now to FIG. 5, the alcohol purge multiplier update of the method of FIG. 1 will be described in greater detail. In block 100, the methodology enables the fuel vapor purge solenoid. After turning on the fuel vapor purge solenoid in block 100, the methodology advances to decision block 124. In decision block 124, the methodology determines if the short term oxygen sensor feedback variable is within a specified range. If so, the methodology advances to bubble 126 where it is forwarded to bubble 500 and is returned to start-up bubble 10 (FIG. 1). If the short term oxygen sensor feedback variable is outside of the specified range at decision block 124, the methodology advances to block 128 and updates the alcohol purge multiplier. After updating the alcohol purge multiplier at block 128, the methodology advances to decision block 130.

In decision block 130, the methodology determines if a third update indicator has been triggered. If so, the methodology advances to bubble 132 where it is forwarded to block 300 (FIG. 4). If the third update has not been triggered at decision block 130, the methodology advances to bubble 500 and is returned to start-up block 10 (FIG. 1).

Turning now to FIG. 6, a flow chart for a method of detecting an error in the fuel system by use of the fuel system monitor during alcohol operation is depicted. The methodology starts in bubble 134 and advances to decision block 136. In decision block 136, the methodology determines if the fuel composition multiplier is below a low value threshold. If so, the methodology advances to decision block 138. In decision block 138, the methodology determines if the product of the short term oxygen sensor feedback variable and the gasoline long term fuel adaptive memory value is within a specified range. If so, the methodology advances to bubble 140 where it is returned to start-up bubble 134.

If the product of the short term oxygen sensor feedback variable and the gasoline long term fuel adaptive memory value is outside of the specified range at decision block 138, the methodology advances to block 142 and sets a fuel system monitor fault. From block 142, the methodology advances to bubble 140 and is returned to start-up bubble 134.

Referring again to decision block 136, if the fuel composition multiplier is not below the low value threshold, the methodology advances to decision block 144. In decision block 144, the methodology determines if the product of the short term oxygen sensor feedback variable and the alcohol purge multiplier is outside a specified range. If not, the methodology advances from decision block 144 to bubble 140 where it is returned to start-up bubble 134. If the product of the short term oxygen sensor feedback variable and the alcohol purge multiplier is outside the specified range value at block 144, the methodology advances to block 142. At block 142, the methodology sets the fuel system monitor fault. From block 142, the methodology advances to bubble 140 where it is returned to start-up bubble 134.

According to the above, the present invention provides a flexible fuel compensation system which uses an oxygen feedback system rather than a fuel composition sensor to determine the percent alcohol content of fuel. According to the present invention, an alcohol threshold is used to determine the operating parameters to be set for the vehicle. When a fuel composition multiplier based on the percent alcohol content of the fuel in the vehicle is below the threshold, gasoline operating parameters are used. When the fuel composition multiplier is above the threshold, alcohol operating parameters are used. Additionally, a counter of gasoline fills must be satisfied before OBDII monitors are reenabled after an alcohol use. Also, users of high alcohol concentration fuel are identified and alcohol specific controls are disabled for gasoline and low alcohol concentration fuel users. Furthermore, an alcohol purge multiplier is used in place of the gasoline long term fuel adaptive memory when operating on alcohol to allow for fuel system errors to be detected during alcohol operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims. For instance, the present invention is particularly well suited for operation in conjunction with other fuel control systems such as those described in U.S. Ser. No. 08/959,815, entitled "Method of Determining Ethanol Thresholds in a Flexible Fueled Vehicle" to Moote et al.; U.S. Ser. No. 08/958,411, entitled "Method of Determining the Composition of Fuel in a Flexible Fueled Vehicle after Fuel Blending" to Huff et al.; U.S. Ser. No. 08/959,791, entitled "Method of Determining the Composition of Fuel in a Flexible Fueled Vehicle without an O2 Sensor" to Rotramel et al.; U.S. Ser. No. 08/958,411, entitled "Method for Determining the Composition of Fuel in a Flexible Fueled Vehicle with an O2 Sensor" to Seitz et al; U.S. Ser. No. 08/959,696, entitled "Method of Compensating for Boil-Off Alcohol in a Flexible Fueled Vehicle without a PCV Solenoid" to Huff et al; U.S. Ser. No. 08/959,818, entitled "Method of Controlling the Air to Fuel Ratio in a Flexible Fueled Vehicle During Wide Open Throttle or Part Throttle Enrichment Operation" to Cheng et al; U.S. Ser. No. 08/959,695, entitled "Method of Compensating for a Failed Sensor in a Flexible Fueled Vehicle" to Joyce et al; U.S. Ser. No. 08/959,772 entitled "Fuel Control Enhancements for a Sensorless Flexible Fueled Vehicle" to Krausman et al.; U.S. Ser. No. 08/959,817, entitled "Method of Compensating for Boil-Off Alcohol in a Flexible Fueled Vehicle with a PCV Solenoid" to Kennie et al; and U.S. Ser. No. 08/959,817, entitled "Method of Compensating for Changing Fuels in a Flexible Fueled Vehicle Using a Fuel Composition Sensor" to Cheng et al. which are all expressly incorporated by reference herein.

What is claimed is:

1. A method of controlling combustion parameters of an internal combustion engine without a fuel composition sensor based on a learned value of percent alcohol content of a fuel comprising:

determining a fuel composition multiplier based on said percent alcohol content of said fuel using an oxygen feedback system;

comparing said fuel composition multiplier to a first threshold;

comparing said fuel composition multiplier to a second threshold if said fuel composition multiplier is greater than said first threshold;

implementing gasoline operating parameters for said internal combustion engine if said fuel composition multiplier is less than said first threshold;

implementing mixed gasoline/alcohol operating parameters for said internal combustion engine if said fuel composition multiplier is greater than said first threshold based on said percent alcohol content of said fuel;

incrementing a counter if said fuel composition multiplier is greater than said second threshold; and implementing high concentration alcohol operating parameters for said internal combustion engine if said counter is greater than a preselected value.

2. The method of claim 1 wherein said step of determining said fuel composition multiplier based on said percent alcohol content of said fuel is delayed until new fuel reaches said engine.

3. The method of claim 2 wherein said delay is dependent on a flow rate of said new fuel through a fuel system associated with said vehicle and is based on an accumulation of fuel injector pulse widths which are proportional to a volume of said fuel delivered.

4. The method of claim 1 wherein said fuel composition multiplier is incremented and decremented based on a short term exhaust stream oxygen feedback variable from said oxygen feedback system.

5. The method of claim 4 wherein said fuel composition multiplier is incremented if said short term oxygen sensor feedback variable adds in more fuel than a given positive threshold.

6. The method of claim 5 wherein said given positive threshold corresponds to engine coolant temperature and idle/off-idle status of said engine.

7. The method of claim 4 wherein said fuel composition multiplier is decremented if said short term oxygen sensor feedback variable takes out more fuel than a given negative threshold.

8. The method of claim 7 wherein said given negative threshold corresponds to engine coolant temperature and idle/off-idle status of said engine.

9. The method of claim 1 further comprising coarsely updating said fuel composition multiplier based on said percent alcohol content of said fuel until one of a minimum coolant temperature and a time delay is reached.

10. The method of claim 1 further comprising updating said fuel composition multiplier after a predetermined time period and re-comparing said fuel composition multiplier to said first and second thresholds and implementing an appropriate one of said operating parameters based on said comparison.

11. The method of claim 10 wherein said predetermined time period is based on a second injector pulse width accumulation point which is large enough to insure that newly added fuel is fully blended with old fuel and that all of the old fuel not blended with the newly added fuel is completely expelled from a fuel system associated with said vehicle.

12. The method of claim 10 further comprising limiting said updating of said fuel composition multiplier to steady state operating conditions so that any errors in transient fueling are not transferred to said fuel composition multiplier.

13. The method of claim 10 further comprising disabling a fuel vapor management system of said vehicle during said update so that alcohol vapors do not influence said determination of said fuel composition multiplier based on said percent alcohol content.

14. The method of claim 13 further comprising reenabling said fuel vapor management system after a timer expires indicating that said updating of said fuel composition multiplier is complete.

15. The method of claim 10 further comprising compensating for corruptive fuel vapors drawn into said internal combustion engine if operating under said mixed gasoline/alcohol operating parameters.

16. The method of claim 15 further comprising removing compensation for said corruptive fuel vapors drawn into said internal combustion engine on a cold start if said compensation would reduce an amount of fuel delivered to said internal combustion engine more than a calibratable amount.

17. The method of claim 10 further comprising re-updating said fuel composition multiplier if an error is detected in said fuel composition multiplier and said error is greater than a given threshold.

18. The method of claim 17 wherein said error is detected by a fuel vapor management system of said vehicle during operation under said mixed gasoline/alcohol operating parameters.

19. The method of claim 18 wherein said fuel vapor management system monitors an alcohol purge multiplier to detect said error.

20. The method of claim 19 wherein said error is deemed to be detected if said alcohol purge multiplier indicates a need for an increase in fuel being delivered to said engine.

21. The method of claim 17 wherein said step of re-updating said fuel composition multiplier is based on a short term oxygen sensor feedback variable from said oxygen feedback system during steady state operating conditions.

22. The method of claim 17 wherein said step of re-updating said fuel composition multiplier is continued until a third update exit timer expires which is only counted during steady state conditions.

23. The method of claim 1 further comprising employing an alcohol purge multiplier when operating under said mixed gasoline/alcohol operating parameters to compensate for any correction from fuel vapors drawn into the engine.

24. The method of claim 23 wherein said alcohol purge multiplier is cleared during operation under said gasoline operating parameters.

25. The method of claim 1 wherein said fuel composition multiplier corresponds to a product of a gasoline long term fuel adaptive memory value, a short term oxygen sensor feedback variable and an alcohol purge multiplier.

26. The method of claim 1 further comprising disabling select on board diagnostic monitors when said percent ethanol content of said fuel is greater than an on board diagnostic monitor ethanol threshold.

27. The method of claim 26 wherein said on board diagnostic monitor ethanol threshold is interpolated from an off-idle gasoline purge free adaptive memory value.

28. The method of claim 1 wherein said step of implementing gasoline operating parameters for said internal combustion engine further comprises:

clearing said fuel composition multiplier such that said percent alcohol content of said fuel is set to zero;

enabling normal gasoline control operations; and setting select on board diagnostic monitors to a disabled state until a preselected number of gasoline fills occur.

29. The method of claim 1 wherein said step of implementing mixed gas/alcohol operating parameters for said internal combustion engine further comprises:

clearing a gasoline long term fuel adaptive memory;

storing said fuel composition multiplier in said memory;

replacing a function of said gasoline long term adaptive memory with said fuel composition multiplier;

disabling select on board diagnostic monitors; and clearing a gasoline fill counter.

30. The method of claim 1 further comprising setting a fuel system monitor fault for said flexible fueled vehicle based on said percent alcohol content.

31. The method of claim 30 further comprising:

setting said fuel system monitor fault to a failure state if said fuel composition multiplier is less than said first threshold and a product of a short term oxygen sensor feedback variable from said oxygen feedback system and a gasoline long term fuel adaptive memory value is outside of a given range; and setting said fuel system monitor fault to said failure state if said fuel composition multiplier is greater than said first threshold and a product of said short term oxygen sensor feedback variable, and said long term fuel adaptive memory value, and an alcohol purge multiplier is outside of said given range.

32. The method of claim 31 further comprising pending said fuel system monitor during boil-off and fuel blending conditions.

* * * * *